United States Patent
Kaplan et al.

(10) Patent No.: US 9,008,296 B2
(45) Date of Patent: Apr. 14, 2015

(54) CATCHING UP WITH AN ONGOING CONFERENCE CALL

(71) Applicant: Microsoft Technology Licensing, LLC, Redmond, WA (US)

(72) Inventors: Keith Stuart Kaplan, Bothell, WA (US); Jonathan Wiswall, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/914,601

(22) Filed: Jun. 10, 2013

(65) Prior Publication Data

US 2014/0362979 A1   Dec. 11, 2014

(51) Int. Cl.
| | |
|---|---|
| *H04M 3/42* | (2006.01) |
| *H04M 1/64* | (2006.01) |
| *H04L 12/16* | (2006.01) |
| *H04Q 11/00* | (2006.01) |
| *H04L 12/58* | (2006.01) |
| *H04M 1/656* | (2006.01) |
| *H04M 3/56* | (2006.01) |

(52) U.S. Cl.
CPC ............... *H04M 1/656* (2013.01); *H04M 3/56* (2013.01); *H04M 3/42221* (2013.01); *H04M 2203/2088* (2013.01); *H04M 2203/305* (2013.01)

(58) Field of Classification Search
CPC ............ H04L 12/1831; H04L 12/1818; H04L 12/1822; H04L 12/1827; H04M 2203/2088; H04M 3/42221; H04M 3/56
USPC .............. 379/202.01, 68, 85, 88.12; 370/260; 455/412.1, 416, 412.2
See application file for complete search history.

(56) References Cited

U.S. PATENT DOCUMENTS

| | | | |
|---|---|---|---|
| 7,970,385 B1 * | 6/2011 | Satapathy | .................. 455/412.1 |
| 8,370,142 B2 | 2/2013 | Frankel et al. | |
| 8,797,380 B2 | 8/2014 | Quinn et al. | |

(Continued)

FOREIGN PATENT DOCUMENTS

EP   2490424 A1   8/2012

OTHER PUBLICATIONS

Valentine, Jeff, "Callfinity (tm) Launches ConferenceShifter (tm) to Allow Conference Call Participants to Pause and Resume a Live Conference Call", Retrieved at <<http://www.prweb.com/releases/2005/10/prweb295112.htm >>, Oct. 7, 2005, p. 1.

(Continued)

*Primary Examiner* — Thjuan K Addy
(74) *Attorney, Agent, or Firm* — Aaron Chatterjee; Kate Drakos; Micky Minhas

(57) ABSTRACT

Various technologies described herein pertain to retaining content of a conference call for accelerated replay. The content of the conference call can be recorded. Further, establishment of a connection of a participant to the conference call can be detected. For instance, the connection can be established with a computing device of the participant. Moreover, the establishment of the connection of the participant to the conference call can be detected subsequent to initiation of the recording of the content of the conference call. Responsive to detection of the establishment of the connection of the participant to the conference call, at least a portion of recorded content of the conference call can be transmitted to the computing device for playback at a playback speed that is greater than a speed at which the content is recorded.

20 Claims, 12 Drawing Sheets

(56) References Cited

U.S. PATENT DOCUMENTS

| | | | |
|---|---|---|---|
| 2004/0203677 | A1 | 10/2004 | Brown et al. |
| 2005/0233736 | A1 | 10/2005 | Berstis et al. |
| 2007/0133523 | A1 | 6/2007 | Kwon |
| 2007/0263603 | A1 | 11/2007 | Schmitt |
| 2008/0137558 | A1* | 6/2008 | Baird .......................... 370/260 |
| 2009/0220066 | A1 | 9/2009 | Shaffer et al. |
| 2009/0300520 | A1 | 12/2009 | Ashutosh et al. |
| 2010/0061539 | A1 | 3/2010 | Cloran et al. |
| 2010/0125791 | A1 | 5/2010 | Katis et al. |
| 2010/0150320 | A1 | 6/2010 | Lingafelt et al. |
| 2010/0232579 | A1 | 9/2010 | Hearn |
| 2011/0249078 | A1 | 10/2011 | Abuan et al. |
| 2012/0213339 | A1 | 8/2012 | Oliver et al. |

OTHER PUBLICATIONS

"Record and Play Back a Lync Meeting", Retrieved at <<http://office.microsoft.com/en-in/lync-help/record-and-play-back-a-lync-meeting-HA102809287.aspx>>, Retrieval Date: Mar. 8, 2013, p. 1.

"International Search Report and Written Opinion for Application No. PCT/US2014/040975", Mailing Date: Sep. 24, 2014, Filed Dated: Jun. 5, 2014, 10 pages.

"Response to International Search Report (ISR) and Written Opinion for PCT Patent Application No. PCT/US/2014/040975", Filed Date: Jan. 7, 2015, 7 Pages.

Inkpen, et al., "What Did I Miss? In-Meeting Review using Multimodal Accelerated Instant Replay (AIR) Conferencing Presentation", Retrieved at: <<http://research.microsoft.com/pubs/148460/CHI2011AIRPresentation.pptx>>, 2011, 34 Pages.

Hegde, et al., "AIRMobile: Accelerated Instant Reply for In-Meeting Review by Mobile Users", Retrieved at: <<http://research.microsoft.com/pubs/188615/CSCW2011AIRMobileAbstract.pdf>>, CSCW 2011, Mar. 19, 2011, 2 Pages.

Junuzovic, et al., "What Did I Miss? In-Meeting Review using Multimodal Accelerated Instant Replay (AIR) Conferencing", ACM Conference on Computer-Human Interaction, May 2011, 10 Pages.

* cited by examiner

CATCHING UP WITH AN ONGOING CONFERENCE CALL

BACKGROUND

During a conference call, three or more participants can communicate with each other. Audio data (e.g., voice, etc.) is oftentimes exchanged between the participants of a conference call. Accordingly, audio data captured from a particular participant can be sent to the other participants connected to the conference call. Moreover, some conventional approaches support broadcast of other types of data such as video data, presentation data, instant messaging data, and so forth from a given participant to other participants connected to the conference call.

Communication services that enable multiparty conference calls have become more prevalent. Such communication services commonly allow participants to join a conference call using various types of devices. Examples of devices that can be utilized to join a conference call include phones, personal computers, mobile devices (e.g., mobile phones, tablets, portable gaming devices, etc.) and so forth.

Various scenarios can cause a participant to miss a part of an ongoing conference call. According to an exemplary scenario, a participant may join the conference call late (e.g., after some time has elapsed since a beginning of the conference call). In accordance with another exemplary scenario, a participant may be disconnected from the conference call; while the participant can subsequently reconnect to the conference call, a portion of the conference call is missed during the time period of the disconnection. A participant may be disconnected due to a lack of network connectivity, when switching between devices, or the like.

According to an illustration, a participant can initially join a conference call at the start of the conference call using a phone at his home. When the participant is ready to leave his house for work, he can disconnect the phone from the conference call, walk to his car, and reconnect to the conference call using a mobile device in the car. The participant can drive to work while connected to the conference call utilizing the mobile device. Upon arriving at his office, the participant can disconnect the mobile device from the conference call and reconnect to the conference call using another personal computer to finish the conference call. The participant may miss a portion of the conference call, for instance, when switching between devices (e.g., switching from the phone at his home to the mobile device, switching from the mobile device to the personal computer at his office). Moreover, the participant may miss a portion of the conference call if a device loses network connectivity (e.g., if the mobile device loses network connectivity when driving through a tunnel).

Conventional approaches to mitigate detrimental impact due to missed portions of a conference call commonly involve recording the conference call. Such approaches typically enable a participant who misses a part of the conference call to review the recording after the end of the conference call at normal speed (e.g., speed at which content is recorded).

SUMMARY

Described herein are various technologies that pertain to retaining content of a conference call for accelerated replay. The content of the conference call can be recorded. For example, recording of the content of the conference call can start at a beginning of the conference call. According to another example, recording of the content of the conference call can be initiated in response to detection of a disconnection of a participant from the conference call. Further, establishment of a connection of a participant to the conference call can be detected. For instance, the connection can be established with a computing device of the participant. Moreover, the establishment of the connection of the participant to the conference call can be detected subsequent to initiation of the recording of the content of the conference call. Responsive to detection of the establishment of the connection of the participant to the conference call, at least a portion of recorded content of the conference call can be transmitted to the computing device for playback at a playback speed that is greater than a speed at which the content is recorded.

According to various embodiments described herein, notifications pertaining to status information can be provided to participants. For example, a participant can be notified upon reaching real time in the conference call. Following this example, an indication can be transmitted from a server (e.g., communications server, replay server, etc.) to a computing device of the participant when the participant reaches real time in the conference call. Further, the indication can cause the computing device to output a notification that signifies that the participant is at real time in the conference call. By way of another example, a participant can be notified when a disparate participant reaches real time in the conference call. Moreover, when at real time, a participant may be permitted to participate in the conference call.

In accordance with various embodiments, a computing device of a participant can establish a connection to a conference call. The connection can be established subsequent to a portion of the conference call missed by the participant (e.g., the connection can be an initial connection to the conference call for the participant or a reconnection to the conference call). Moreover, recorded content of the conference call can be received. The recorded content of the conference call can include at least a part of the portion of the conference call missed by the participant. Further, the recorded content of the conference call can be output at a playback speed that is greater than a speed at which the portion of the conference call missed by the participant is recorded.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
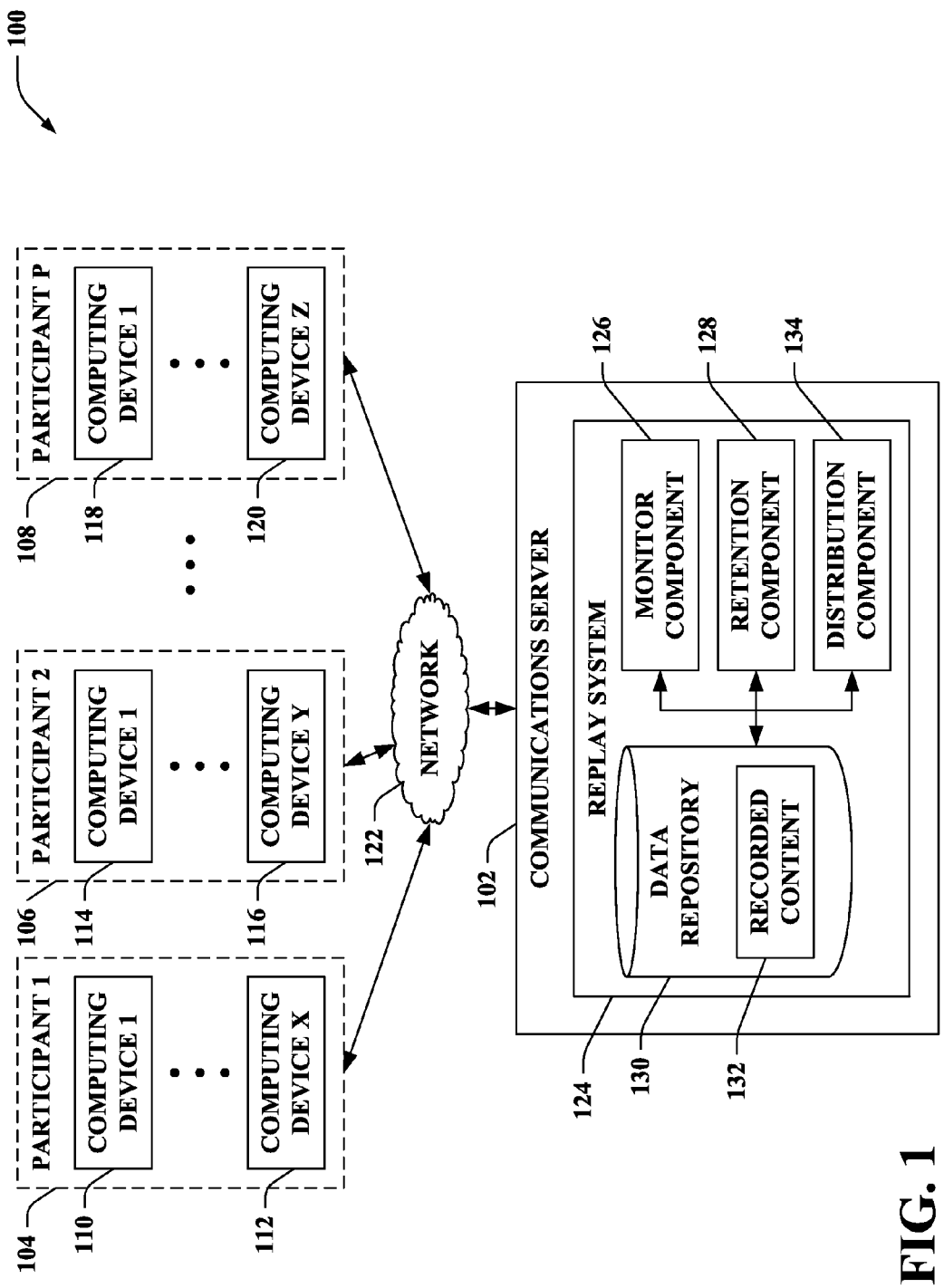
FIG. 1 illustrates a functional block diagram of an exemplary system that records content of a conference call and provides recorded content during the conference call to one or more participants that miss a portion of the conference call for accelerated replay.

Various technologies pertaining to recording content of a conference call and distributing recorded content during the conference call to one or more participants that miss a portion of the conference call for accelerated replay are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, content of a conference call can be recorded. Further, recorded content of the conference call can be distributed during the conference call to a participant that misses a portion of the conference call responsive to the participant connecting to the conference call. For instance, the conference call can be automatically paused when the participant loses a connection to the conference call. Further, the conference call can be resumed when the connection to the conference call is restored. Additionally or alternatively, the conference call can be recorded from a beginning time of the conference call (e.g., based upon a setting, upon detecting that one or more expected participants has not yet joined the conference call, etc.); thus, if a participant joins the conference call late (e.g., after the beginning time of the conference call), then the participant can start the conference call from the beginning time of the conference call.

The recorded content can be transmitted to a computing device of the participant responsive to detection of the establishment of the connection of the participant to the conference call for playback at a playback speed that is greater than a speed at which the content is recorded. When not at real time, the participant is typically unable to interact on the conference call (e.g., inhibited from asking questions, contributing to a brainstorming session conducted during the conference call, etc.); for instance, a microphone of a computing device of the participant can be muted when the participant is not at real time. When at real time, the participant may be permitted to interact on the conference call (e.g., the microphone of the computing device of the participant can be turned on when the participant catches up to real time). Moreover, according to various embodiments, the participant can be notified upon reaching real time (e.g., notify the participant that he is able to interact on the conference call).

According to an illustration, a replay system can keep track of which participants are connected to the conference call. When one or more participants go offline (unless deliberately exiting the conference call), the replay system can begin recording content of the conference call (e.g., audio data, video data, etc.), for example. Moreover, the replay system can begin transcribing speech as text upon one or more participants going offline. According to other examples, however, it is contemplated that the content of the conference call can be recorded from a beginning time of the conference call and/or speech can be transcribed from the beginning time of the conference call. Pursuant to an illustration, a conference system (e.g., a communications server) can obtain information that describes invitees of the conference call, where the invitees (or a subset thereof that accept invitations to the conference call or otherwise indicate anticipated participation in the conference call) can be expected participants for the conference call. Following this illustration, upon detecting that one or more of the expected participants have not joined the conference call by a particular time (e.g., the beginning time of the conference call, within T minutes of the beginning time of the conference call where T is substantially any positive real number, etc.), then the replay system can begin recording the content of the conference call, speech can be transcribed, and so forth. By way of another illustration, the content of the conference call can automatically be recorded from the beginning time of the conference call, speech can be transcribed from the beginning time of the conference call, etc. (e.g., without detecting whether all expected participants have joined the conference call).

When a computing device of a participant establishes a connection to the conference call (e.g., comes back online, joins late, etc.), the computing device can request a missed portion of the conference call from the replay system. Further, the missed portion of the conference call can be replayed at an increased speed. By way of example, timestamps (or frame numbers) may be used to specify which portion of the conference call was missed (e.g., resume chat ID #4217 beginning at time 14:07, etc.). If and when a participant catches up to real time, the computing device can notify the participant and/or the replay system, for example. Moreover, if the participants of a conference call are all at real time, then the replay system can discontinue recording the content, transcribing the speech, etc.; however, it is further contemplated that the recording can continue, the speech can continue to be transcribed, etc. for other purposes (e.g., archive the conference call, etc.).

Referring now to the drawings, FIG. 1 illustrates a system 100 that records content of a conference call and provides recorded content during the conference call to one or more participants that miss a portion of the conference call for accelerated replay. The system 100 includes a communication server 102 that manages the conference call. The communications server 102, for example, can execute a conference system. Further, at least three participants join the conference call. More particularly, a participant 1 104, a participant 2 106, . . . , and a participant P 108 (collectively referred to herein as participants 104-108) can join the conference call, where P is substantially any integer equal to or greater than three. While many of the following examples describe three participants joining the conference call (e.g., the participant 1 104, the participant 2 106, and the participant P 108), it is to be appreciated that such examples can be extended to scenarios where more than three participants join the conference call.

Each of the participants 104-108 can employ one or more computing devices to connect to the conference call. For instance, the participant 1 104 can use a computing device 1 110, . . . , or a computing device X 112 to connect to the conference call, where X can be substantially any integer (collectively referred to herein as computing devices 110-112). Similarly, the participant 2 106 can use a computing device 1 114, . . . , or a computing device Y 116 to connect to the conference call, where Y can be substantially any integer (collectively referred to herein as computing devices 114-116). Likewise, the participant P 108 can use a computing device 1 118, . . . , or a computing device Z 120 to connect to the conference call, where Z can be substantially any integer (collectively referred to herein as computing devices 118-120). While FIG. 1 depicts each of the participants 104-108 being associated with two or more respective computing devices, it is to be appreciated that one or more of the participants 104-108 can be associated with one computing device (e.g., the participant 1 104 can use the computing device 1 110 to connect to the conference call). It is also contemplated that two or more of the participants 104-108 can be associated with the same number of computing devices (e.g., X can equal Y). Moreover, it is contemplated that two or more of the participants 104-108 can be associated with differing numbers of computing devices (e.g., X can differ from Y).

It is to be appreciated that the participants 104-108 can employ substantially any type of computing device. Examples of computing devices include phones, personal computers, gaming consoles, mobile devices (e.g., mobile phones, tablets, portable gaming devices, etc.), and so forth. Thus, according to an illustration, the computing device 1 110 can be a tablet and the computing device X 112 can be a mobile phone (e.g., smartphone); yet, the claimed subject matter is not so limited.

The participants 104-108 can connect to the conference call using one or more of their respective computing devices. Further, the computing devices can establish a connection to the conference call via a network 122. Thus, data can be exchanged between computing devices of the participants 104-108 over the network 122.

According to an example, a participant can connect to the conference call with one computing device at a given time. By way of illustration, the participant 1 104 can connect to the conference call using the computing device 1 110 at a given time, while the remainder of the computing devices of the participant 1 104 (e.g., the computing device X 112) are not used to connect to the conference call at the given time. Further, a participant can switch from using one computing device during a first time period to a second computing device during a second time period to connect to the conference call. For instance, the participant 1 104 can connect to the conference call using the computing device 1 110 during a first time period; the participant 1 104 can further switch to use the computing device X 112 to connect to the conference call during the second time period. By way of another example, a participant can connect to the conference call with two or more computing devices at a given time. Following this example, the participant 1 104 can connect to the conference call using the computing device 1 110 and the computing device X 112 at a given time. When connecting to the conference call with two or more computing devices, a participant can likewise switch devices used to connect to the conference call.

The system 100 can support substantially any type of conference call. According to an example, the conference call can be a peer-to-peer conference call. By way of illustration, the participant 1 104 can use the computing device 1 110 to connect to the conference call, the participant 2 106 can use the computing device 1 114 to connect to the conference call, and the participant P 108 can use the computing device 1 118 to connect to the conference call. Thus, the computing device 1 110, the computing device 1 114, and the computing device 1 118 can be peer nodes that can exchange content with each other without a central infrastructure. For instance, the computing device 1 110 can send content to and receive content from the computing device 1 114 and the computing device 1 118 over the network 122 without a central infrastructure. Moreover, it is contemplated that the communications server 102 can be a peer node for a peer-to-peer conference call.

By way of another example, the system 100 can support a centralized server-based conference call. Again, the participant 1 104 can use the computing device 1 110 to connect to the conference call, the participant 2 106 can use the computing device 1 114 to connect to the conference call, and the participant P 108 can use the computing device 1 118 to connect to the conference call. Thus, the computing device 1 110 can send content to the communications server 102 over the network 122, and the communications server 102 can send the content to the computing device 1 114 and the computing device 1 118 over the network 122. Likewise, the computing device 1 110 can receive content from the communications server 102 (e.g., from the computing device 1 114 or the computing device 1 118) over the network 122.

In accordance with another example, the system 100 can support a conference call that is a combination of a peer-to-peer conference call and a centralized server-based conference call. For instance, some content (e.g., audio data, video data, etc.) can be exchanged between computing devices in a peer-to-peer manner, while other content (e.g., instant messaging data, etc.) can be exchanged using a central infrastructure.

Figure 2:
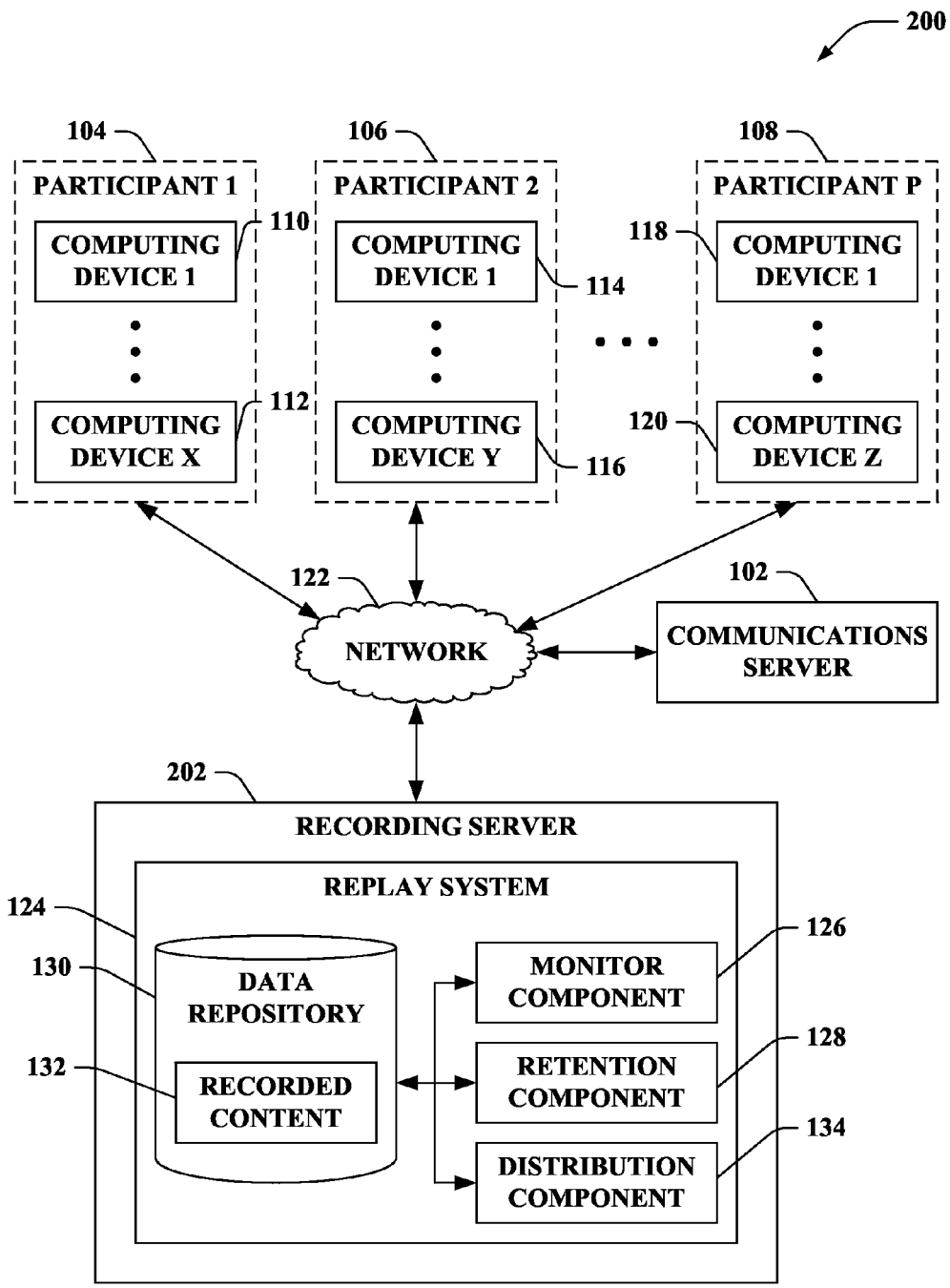
FIG. 2 illustrates a functional block diagram of another exemplary system that records content of a conference call and provides recorded content during the conference call to one or more participants that miss a portion of the conference call for accelerated replay.

The system 100 includes a replay system 124 that retains content of the conference call for replay. In the example set forth in FIG. 1, the replay system 124 is comprised by the communications server 102 that manages the conference call. However, it is contemplated that a recording server can include the replay system 124 (as depicted in FIG. 2), one or more computing devices of one or more of the participants 104-108 can include the replay system 124, a combination thereof, and so forth.

The replay system 124 includes a monitor component 126 that detects a state of connectivity of the participants 104-108 of the conference call. For instance, the monitor component 126 can detect establishment of a connection of a participant to the conference call or a disconnection of a participant from the conference call. Further, the monitor component 126 can detect whether expected participants have or have not joined the conference call. For example, the communications server 102 (e.g., the conference system) can obtain information that describes invitees of the conference call, where the invitees (or a subset thereof that accept invitations to the conference call or otherwise indicate anticipated participation in the conference call) can be expected participants in the conference call. Pursuant to this example, the monitor component 126 can detect whether the expected participants have or have not joined the conference call.

Moreover, the replay system 124 includes a retention component 128, a data repository 130, and a distribution component 134. The retention component 128 can record content of the conference call in the data repository 130. Thus, the retention component 128 retains recorded content 132 in the data repository 130. The recorded content 132 can include audio data, video data, text data, slides, instant messages, and so forth. Moreover, various types of data included in the recorded content 132 can be synchronized for replay. Further, the distribution component 134 transmits the recorded content 132 of the conference call to one or more of the participants 104-108. The distribution component 134 can transmit the recorded content 132 of the conference call while the conference call is ongoing; however, it is contemplated that the distribution component 134 can also send the recorded content 132 of the conference call after the conference call has ended. The distribution component 134 sends the recorded content 132 to one or more of the participants 104-108 (e.g., computing devices of the one or more participants 104-108) for playback at a playback speed that is greater than a speed at which the content is recorded. For instance, the recorded content 132 can be altered by the replay system 124 to enable the playback to be at a playback speed that is greater than the speed at which the content is recorded. Additionally or alternatively, a computing device to which the distribution component 134 sends the recorded content 132 can alter the recorded content 132 to enable the playback to be at a playback speed that is greater than the speed at which the content is recorded (e.g., the recorded content 132 can be unaltered by the replay system 124, the recorded content 132 can also be altered by the replay system 124, etc.).

The retention component 128 can retain the content of the conference call during a period of time that a participant is not connected to the conference call (e.g., as detected by the monitor component 126). Thereafter, upon subsequent connection (e.g., initial connection or reconnection) of the participant to the conference call (e.g., as detected by the monitor component 126), the distribution component 134 can send the recorded content 132 (or a portion thereof) to such participant. It is to be appreciated that the retention component 128 can continue to store the content of the conference call in the data repository 130 at least until the participant reaches real time in the conference call.

As noted above, the retention component 128 can record the content of the conference call in the data repository 130. According to an example, the retention component 128 can retain the content of the conference call from a beginning time of the conference call (e.g., regardless whether one or more of the participants 104-108 is late to join the conference call, if one or more of the participants 104-108 is late to join the conference call). For instance, upon the monitor component 126 detecting that one or more expected participants (e.g., one or more of the participants 104-108) have not joined the conference call by a particular time (e.g., the beginning of the conference call, within T minutes of the beginning of the conference call where T is substantially any positive real number, etc.), then the retention component 128 can begin recording the content of the conference call. Alternatively, the retention component 128 can retain the content of the conference call regardless whether one or more of the participants 104-108 is late to join the conference call (e.g., without detecting whether all expected participants have joined the conference call). According to another example, the retention component 128 can record the content of the conference call upon the monitor component 126 detecting a disconnection of a participant from the conference call.

An exemplary scenario is presented for illustration purposes. The exemplary scenario is referred to in many of the following examples; yet, it is to be appreciated that the claimed subject matter is not limited to such scenario. Pursuant to the exemplary scenario, the participant 1 104 can be connected to the conference call using the computing device 1 110 and the participant 2 106 can be connected to the conference call using the computing device 1 114 from a beginning of the conference call without disconnection. Moreover, according to the exemplary scenario, the participant P 108 can connect to the conference call using the computing device 1 118 after missing a portion of the conference call.

Following the above-noted exemplary scenario, the monitor component 126 can detect establishment of the connection of the participant P 108 to the conference call. The connection can be established with the computing device 1 118 of the participant P 108. Further, the establishment of the connection of the participant P 108 to the conference call can be detected by the monitor component 126 subsequent to initiation of the recording of the content of the conference call by the retention component 128. Responsive to detection of the establishment of the connection of the participant P 108 to the conference call by the monitor component 126, the distribution component 134 can transmit at least a portion of the recorded content 132 of the conference call to the computing device 1 118 for playback at a playback speed that is greater than a speed at which the content is recorded.

By way of example, the connection of the participant P 108 to the conference call detected by the monitor component 126 can be an initial connection to the conference call (e.g., the participant P 108 joins late after the conference call has begun). Following this example, the retention component 128 can retain the content of the conference call from a beginning time of the conference call. Further, the monitor component 126 can detect the establishment of the initial connection of the participant P 108 to the conference call. In response to detection of the establishment of the connection of the participant P 108 to the conference call by the monitor component 126, the distribution component 134 can transmit at least a portion of the recorded content 132 of the conference call to the computing device 1 118 for playback at a playback speed that is greater than a speed at which the content is recorded.

According to another example, the connection of the participant P 108 to the conference call can be a reconnection to the conference call (e.g., the participant P 108 was previously connected to the conference call, thereafter disconnected from the conference call, and subsequently reconnected to the conference call). Thus, a prior connection of the participant P 108 to the conference call is previously disconnected. As noted above, the retention component 128 can record the content of the conference call. The retention component 128, for instance, can initiate recording the content of the conference call from a time of the disconnection of the participant P 108 from the conference call; thus, the retention component 128 can initiate recording the content responsive to the monitor component 126 detecting the disconnection of the participant P 108 from the conference call. However, it is also contemplated that the retention component 128 may have initiated recording the content of the conference call from a beginning time of the conference call, from a time of disconnection of a disparate participant, or the like. Moreover, the distribution component 134 can transmit the recorded content 132 of the conference call from the time of the disconnection of the participant P 108 from the conference call to the computing device 1 118 of the participant for playback at a playback speed that is greater than the speed at which the content is recorded. The distribution component 134 can transmit the recorded content 132 of the conference call responsive to the monitor component 126 detecting the subsequent reconnection of the participant P 108 to the conference call via the computing device 1 118.

Continued reference is made to the example where the connection of the participant P 108 to the conference call is a reconnection to the conference call via the computing device 1 118. It is contemplated that the prior connection of the participant P 108 to the conference call can be established with the computing device 1 118 of the participant; thus, the participant P 108 can use the same computing device for the subsequent reconnection to the conference call. Moreover, it is contemplated that the prior connection of the participant P 108 to the conference call can be established using a disparate computing device, such as the computing device Z 120; hence, the prior connection can be established with a first computing device and the subsequent reconnection can be established utilizing a disparate second computing device (e.g., the participant P 108 switches computing devices).

Reference is still made to the example where the connection of the participant P 108 to the conference call is a reconnection to the conference call via the computing device 1 118. According to various embodiments, the retention component 128 can discontinue recording of the content of the conference call when the participant P 108 reaches real time in the conference call and disparate participants (e.g., the participant 1 104 and the participant 2 106) of the conference call are at real time in the conference call. Alternatively, it is contemplated that the retention component 128 can continue recording the content of the conference call until the end of the conference call.

The replay system 124 enables automatic pausing of the conference call as well as resuming of the conference call upon connection (e.g., initial connection or reconnection) to the conference call. Playback of the missed part of the conference call can be at a speed that is greater than the speed at which the conference call was recorded. Such increased speed can enable a participant that missed a portion of the conference call to catch up to real time.

Now turning to FIG. 2, illustrated is another system 200 that records content of a conference call and provides recorded content during the conference call to one or more participants that miss a portion of the conference call for accelerated replay. Again, the system 200 includes the communication server 102, the participants 104-108, and the network 122. Further, the participant 1 104 can use the computing devices 110-112, the participant 2 106 can use the computing devices 114-116, . . . , and the participant P 108 can use the computing devices 118-120 to connect to the conference call.

In the example set forth in FIG. 2, the system 200 further includes a recording server 202. The recording server 202 comprises the replay system 124 as described herein. Moreover, the recording server 202 can communicate (e.g., via the network 122) with the communications server 102 that manages the conference call. Thus, the recording server 202 can be separate from the communications server 102.

In accordance with another example (not shown), it is contemplated that the system 200 need not include the communications server 102. According to yet another example (not shown), it is contemplated that one or more of the computing devices of one or more of the participants 104-108 can comprise the replay system 124.

Figure 3:
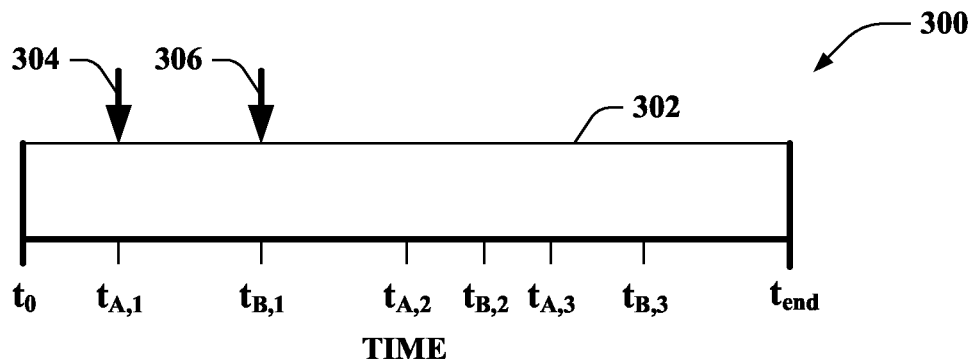
FIGS. 3-5 illustrate various exemplary approaches for recording content of a conference call.
Figure 4:
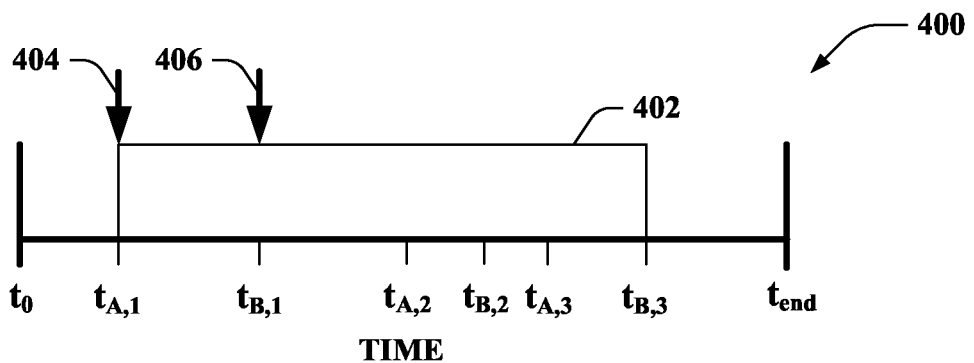
Figure 5:
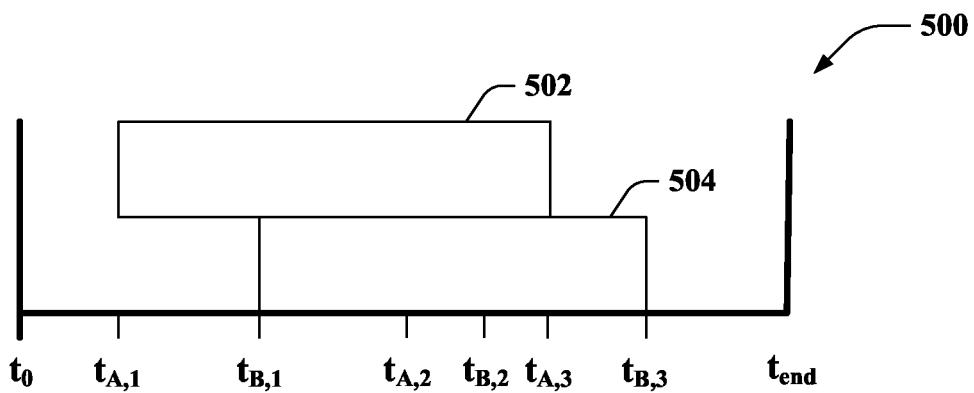

FIGS. 3-5 illustrate various exemplary approaches for recording content of a conference call. In the depicted examples shown in FIGS. 3-5, time $t_0$ is a beginning time of the conference call, time $t_{A,1}$ is a time at which a participant A is disconnected from the conference call, time $t_{B,1}$ is a time at which a participant B is disconnected from the conference call, time $t_{A,2}$ is a time at which the participant A rejoins the conference call, time $t_{B,2}$ is a time at which the participant B rejoins the conference call, time $t_{A,3}$ is a time at which the participant A reaches real time in the conference call, time $t_{B,3}$ is a time at which the participant B reaches real time in the conference call, and time $t_{end}$ is an end time of the conference call. It is contemplated that the participants 104-108 of FIG. 1 can include the participant A and the participant B. Moreover, it is to be appreciated that examples of FIGS. 3-5 are provided for illustration purposes, and the claimed subject matter is not so limited.

Turning to FIG. 3, illustrated is an exemplary approach 300 for recording content 302 of a conference call. As illustrated, the content 302 of the conference call can be recorded from the beginning time of the conference call $t_0$ until the end time of the conference call $t_{end}$. Moreover, the content 302 of the conference call can be recorded with timestamps that specify a beginning of a time period within the conference call missed by each participant. Thus, a timestamp 304 can be retained to specify a beginning of a time period within the conference call missed by the participant A. Further, a timestamp 306 can be retained to specify a beginning of a time period within the conference call missed by the participant B.

Now turning to FIG. 4, illustrated is another exemplary approach 400 for recording content 402 of the conference call. As depicted, recording of the content 402 of the conference call can be initiated at a time of disconnection of a first participant from the conference call (e.g., disconnection of the participant A from the conference call at time $t_{A,1}$). Similar to the example set forth in FIG. 3, timestamps can be retained, where each timestamp can specify a beginning of time period within the conference call missed by a corresponding participant. Thus, a timestamp 404 can be retained to specify a beginning of a time period within the conference call missed by the participant A and a timestamp 406 can be retained to specify a beginning of a time period within the conference call missed by the participant B.

As noted above, the participant A can rejoin the conference call at time $t_{A,2}$, and the participant B can rejoin the conference call at time $t_{B,2}$. Further, the participant A can reach real time in the conference call at time $t_{A,3}$, and the participant B can reach real time at time $t_{B,3}$. In the exemplary approach 400, at the time of a last participant reaching real time in the conference call (e.g., time $t_{B,3}$), the content 402 of the conference call need not continue to be recorded. Thus, the recording of the content 402 can be discontinued at time $t_{B,3}$ when both participants A and B reach real time in the conference call (assuming other participants in the conference call are also at real time in the conference call).

Now turning to FIG. 5, illustrated is another exemplary approach 500 for recording content of the conference call. In the example set forth in FIG. 5, disparate recordings of the content of the conference call can be retained for each participant that misses a portion of the conference call. Thus, content 502 can be recorded for the participant A and content 504 can be recorded for the participant B. The content 502 can be recorded for the participant A from time $t_{A,1}$ at which the participant A is disconnected from the conference call until time $t_{A,3}$ at which the participant A reaches real time in the conference call. Similarly, the content 504 can be recorded for the participant B from time $t_{B,1}$ at which the participant B is disconnected from the conference call until time $t_{B,3}$ at which the participant B reaches real time in the conference call.

Figure 6:
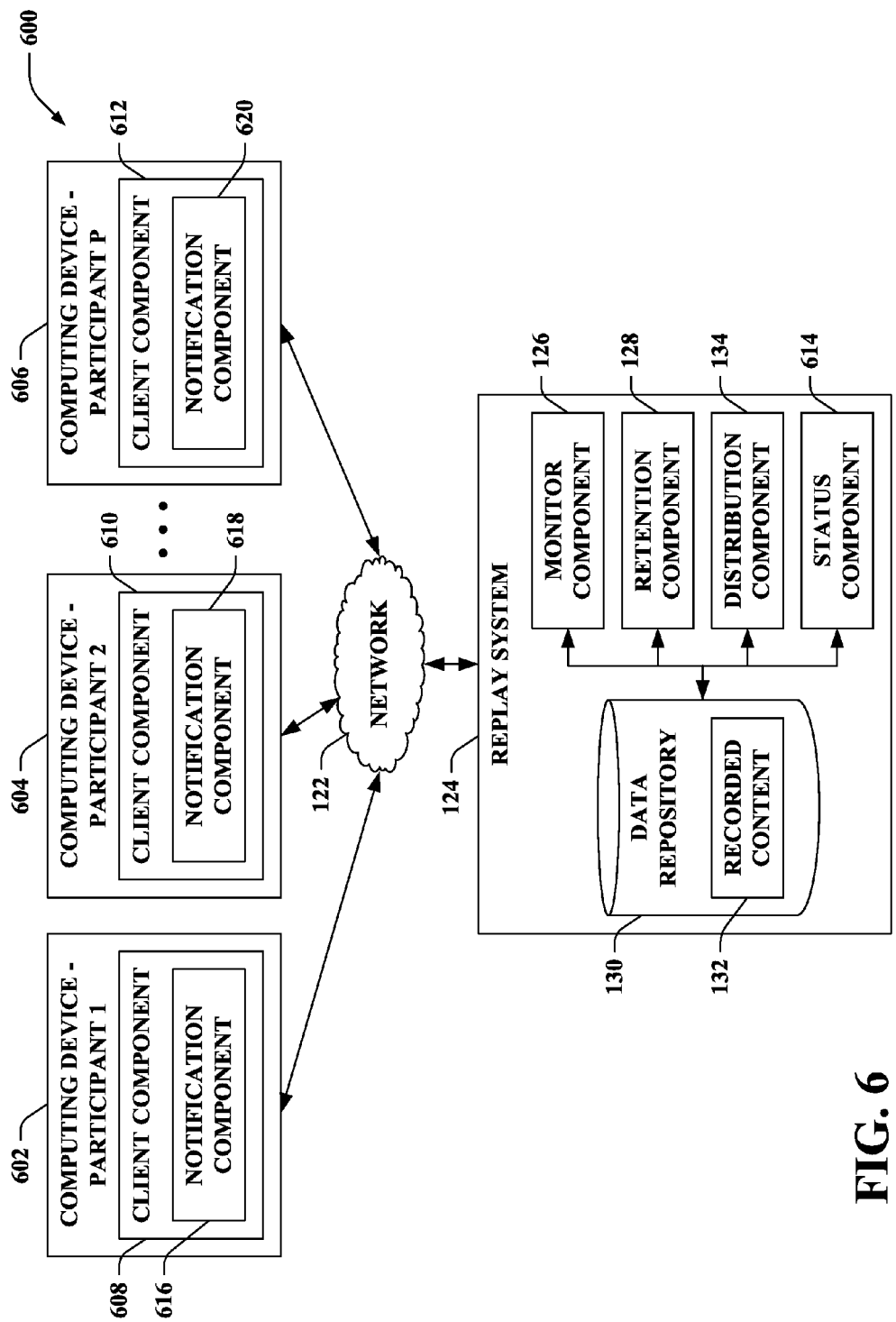
FIG. 6 illustrates a functional block diagram of an exemplary system that notifies participants regarding status information.

Turning to FIG. 6, illustrated is a system 600 that notifies participants regarding status information. The system 600 includes the network 122 and the replay system 124. Moreover, the system 600 includes a computing device 602 of a participant 1, a computing device 604 of a participant 2, ..., and a computing device 606 of a participant P (the participants 104-108 of FIG. 1), collectively referred to herein as the computing devices 602-606.

The computing device 602 can include a client component 608, the computing device 604 can include a client component 610, and the computing device 606 can include a client component 612. The client component 608, the client component 610, and the client component 612 are collectively referred to herein as client components 608-612. The client components 608-612 can be employed by the respective computing devices 602-606 to participate in the conference call.

Moreover, the client component 608 can include a notification component 616, the client component 610 can include a notification component 618, and the client component 612 can include a notification component 620. The notification component 616, the notification component 618, and the notification component 620 are collectively referred to herein as notification components 616-620. The notification components 616-620 can respectively output notifications pertaining to status information via the computing devices 602-606.

When at real time in the conference call, a participant can participate in the conference call. Alternatively, when not at real time (e.g., when reviewing the recorded content 132 during the conference call), a participant can be inhibited from participating in the conference call. For instance, when at real time, a participant can talk, ask questions, make suggestions, etc., as part of the conference call (e.g., a microphone of a computing device of a participant at real time can be on, etc.), while a participant who is not at real time can be inhibited from talking, asking questions, making suggestions, etc. (e.g., a microphone of a computing device of a participant not at real time can be muted, etc.).

According to an example, the notification component 616 can output a notification that signifies that the participant 1 is at real time in the conference call (e.g., such notification can designate that the participant 1 can participate in the conference call). Moreover, it is contemplated that the notification component 616 can output a notification that signifies that the participant 1 is not at real time (e.g., the notification can signify that the participant 1 is unable to participate in the conference call). Additionally or alternatively, the notification component 616 can output disparate notifications to the participant 1 that signify whether other participants (e.g., the participant 2, ..., and the participant P) are at real time in the conference call or not (e.g., the disparate notifications can specify whether the other participants are able to participate in the conference call).

The replay system 124 can include the monitor component 126, the retention component 128, the distribution component 134, and the data repository 130 as described above. Further, the replay system 124 can include a status component 614. The status component 614 can transmit an indication to a computing device of a participant (e.g., one of the computing devices 602-606) when such participant reaches real time in the conference call. According to an example, the computing device 606 of the participant P may be disconnected from the conference call for a period of time. Upon detecting establishment of the connection of the computing device 606 of the participant P to the conference call, the distribution component 134 can transmit the recorded content 132 of the conference call to the computing device 606 for playback at a playback speed that is greater than a speed at which the content is recorded. The status component 614 can detect when the computing device 606 of the participant P reaches real time. Further, when the status component 614 determines that the computing device 606 of the participant P has reached real time, the status component 614 can transmit an indication to the computing device 606 of the participant P (e.g., the notification component 620). The indication sent by the status component 614 to the computing device 606 can cause the notification component 620 to output a notification that signifies that the participant P is at real time in the conference call. For example, the notification component 620 can cause the computing device 606 to output an audible notification, a visual notification, haptic feedback, a combination thereof, or the like to signify that the participant P has caught up with the real time conversation.

Again, reference is made to the above-noted example where the computing device 606 of the participant P is disconnected from the conference call for a period of time. After reconnection, the status component 614 can detect when the computing device 606 of the participant P reaches real time. Responsive to detecting that the computing device 606 of the participant P has reached real time, the status component 614 can transmit an indication to at least one disparate computing device of at least one disparate participant connected to the conference call (e.g., the computing device 602 of the participant 1, the computing device 604 of the participant 2, etc. other than the computing device 606 of the participant P). Such indication can cause a notification component (e.g., the notification component 616, the notification component 618, etc.) of the least one disparate computing device to output a notification that signifies that the participant P is at real time in the conference call. For example, the notification component 616 can cause the computing device 602 to output an audible notification, a visual notification, haptic feedback, a combination thereof, or the like to signify that the participant P has caught up with the real time conversation.

Figure 7:
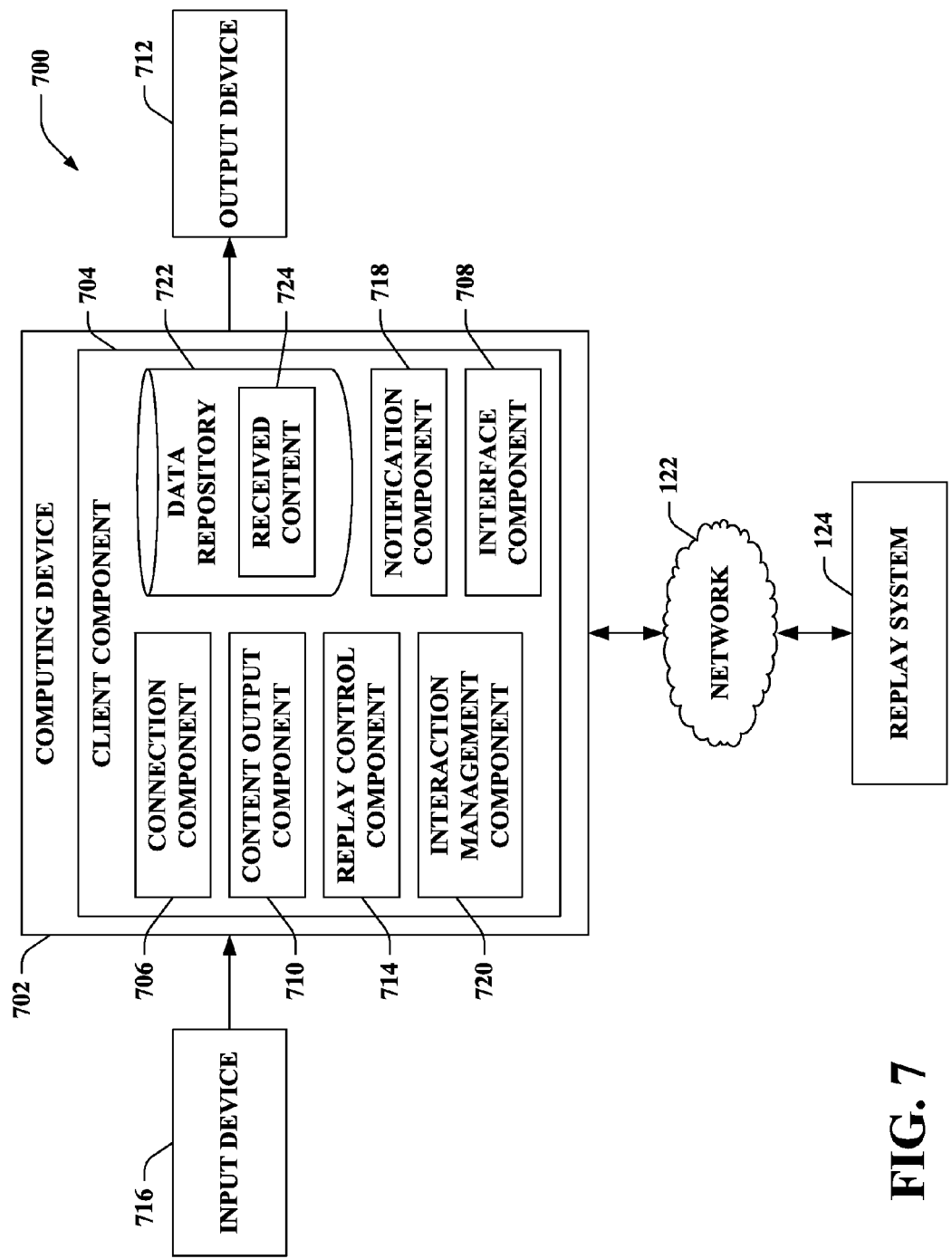
FIG. 7 illustrates a functional block diagram of an exemplary system in which a computing device controls replay of recorded content distributed by a replay system via a network.

Now turning to FIG. 7, illustrated is a system 700 in which a computing device 702 (e.g., one of the computing devices 602-606 of FIG. 6) controls replay of recorded content distributed by the replay system 124 via the network 122. The computing device 702 includes a client component 704. The client component 704 can include a connection component 706 that establishes a connection to the conference call. As described herein, the connection component 706 can establish the connection to the conference call subsequent to a portion of the conference call missed by a participant (e.g., associated with the computing device 702). For instance, the connection can be an initial connection to the conference call for the participant (e.g., the participant joins the conference call late) or a reconnection to the conference call for the participant.

The client component 704 can include an interface component 708 that can receive recorded content of the conference call. For instance, the interface component 708 can receive the recorded content of the conference call from the replay system 124 via the network 122. The recorded content received by the interface component 708 can include at least a part of the portion of the conference call missed by the participant. Moreover, it is contemplated that the interface component 708 can receive real time content of the conference call.

The client component 704 can further include a content output component 710 that outputs the recorded content of the conference call at a playback speed that is greater than a speed at which content of the portion of the conference call missed by the participant is recorded. The content output component 710 can output the recorded content of the conference call utilizing an output device 712 associated with the computing device 702. The output device 712, for instance, can be a display screen, a speaker, a device that generates haptic feedback, a combination thereof, and so forth. Further, upon reaching real time, the content output component 710 can output real time content of the conference call (e.g., utilizing the output device 712).

Moreover, the client component 704 can include a replay control component 714 that controls the replay of the recorded content of the conference call received from the replay system 124 via the network 122. For example, the computing device 702 can receive input from a participant via an input device 716 associated with the computing device 702. The input device 716, for example, can be a touchscreen, a keypad, a sensor (e.g., a camera that can detect gestures, etc.), a microphone, a combination thereof, or the like. Responsive to the received input, the replay control component 714 can manage the replay of the recorded content received from the replay system 124 by the content output component 710.

While the input device 716 and the output device 712 are illustrated as being separate from the computing device 702, it is to be appreciated that the computing device 702 can include the input device 716 and/or the output device 712. Moreover, it is contemplated that the input device 716 and the output device 712 can be a common device (e.g., a touchscreen).

According to an example, the replay control component 714 can receive input that specifies a bit rate for recording of the conference call. The bit rate can be signaled to the replay system 124 for controlling the retention of the recorded content (e.g., by the retention component 128). For example, the bit rate can be specified per conference call (e.g., a first bit rate for a first conference call, a disparate second bit rate for a second conference call, etc.).

According to another example, the replay control component 714 can control the playback speed of the recorded content. For instance, the replay control component 714 can receive input from the input device 716 that specifies the playback speed (e.g., the input can be a click on a fast forward button displayed on a display screen of the computing device 702, manipulation of a slider displayed on the display screen that controls the playback speed, etc.); thus, the replay of the recorded content can be controlled according to such selection. By way of another example, the replay control component 714 can control the playback speed based upon predefined preferences of the participant.

Moreover, the client component 704 can include a notification component 718 (e.g., one of the notification components 616-620 of FIG. 6) that can output a notification utilizing the output device 712. The notification output via the notification component 718 can indicate that the computing device 702 has reached real time in a conference call. Thus, the notification component 718 can output a notification that signifies whether the participant is at real time in the conference call. Additionally or alternatively, the notification component 718 can output a notification that indicates that a disparate computing device of a disparate participant of the conference call has reached real time in the conference call. Accordingly, the notification component 718 can output a notification that signifies whether a disparate participant of the conference call is at real time in the conference call.

The client component 704 can also include an interaction management component 720 that can control interaction of the participant on the conference call based upon whether or not the participant is at real time in the conference call. The interaction management 720 can mute a microphone (e.g., the input device 716) of the computing device 702 when the content output component 710 outputs the recorded content (e.g., when the participant is not at real time in the conference call). Moreover, the interaction management component 720 can unmute the microphone of the computing device 702 when the participant is at real time (e.g., when the content output component 720 outputs real time content of the conference call).

By way of another example, the client component 704 can further include a data repository 722, which can retain received content 724 obtained from the replay system 124. For instance, the received content 724 can be a portion of the conference call (e.g., to provide for buffering in case of subsequent disconnection of the computing device 702 from the conference call). According to another example, the replay system 124 can transmit the recorded content to the computing device 702, which can be retained as the received content 724 in the data repository 722 for subsequent presentation via the output device 712.

FIGS. 8-11, illustrate various exemplary embodiments of the replay system 124. As illustrated in FIGS. 8-11, the replay system 124 includes the monitor component 126, the retention component 128, the distribution component 134, and the data repository 130. Further, the data repository 130 can include the recorded content 132. The examples set forth in FIGS. 8-11 describe various approaches for altering the recorded content 132 of the conference call utilizing the replay system 124 for playback at a playback speed that is greater than a speed at which the content is recorded. Moreover, it is to be appreciated that two or more of the embodiments described in FIGS. 8-11 can be combined; however, the claimed subject matter is not so limited. Further, it is contemplated that the approaches for altering the recorded content 132 described in FIGS. 8-11 can additionally or alternatively be implemented by a computing device (e.g., the client component 704 of the computing device 702 of FIG. 7 can include one or more of the below-described components comprised in the replay system 124).

Figure 8:
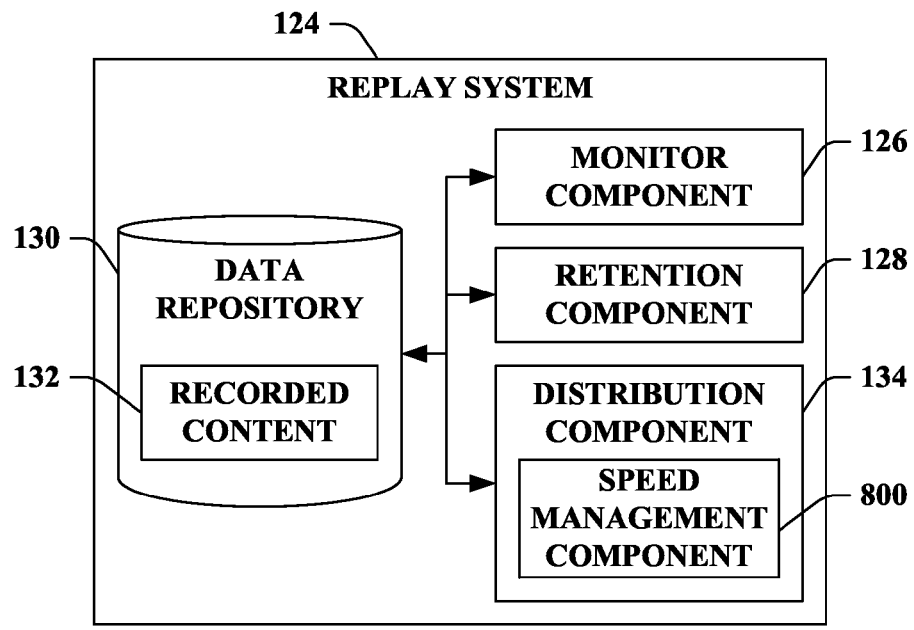
FIGS. 8-11 illustrate various exemplary embodiments of a replay system.

As illustrated in FIG. 8, the distribution component 134 of the replay system 124 can include a speed management component 800. The speed management component 800 can control the playback speed of the recorded content 132 to be output. In order to allow a participant to interact with the conference call (e.g., upon reaching real time in the conference call), the speed management component 800 can cause the recorded content 132 to be played on a computing device of the participant at an increased speed compared to a speed at which the content is recorded. For example, if the participant misses one minute of the conference call and then listens at 1.2× speed upon rejoining the conference call, then the participant can again interact on the conference call after catching up for five minutes. It is to be appreciated, however, that the claimed subject matter is not limited to use of 1.2× speed as other speeds are intended to fall within the scope of the hereto appended claims.

By way of example, the speed management component 800 can employ a fixed playback speed. Following this example, the playback speed can be set for all participants, on a per-participant basis, based upon a type of conference call, or the like. Pursuant to another example, the playback speed for a given participant can be determined by the speed management component 800 based upon speed information received from a computing device of the given participant (e.g., from the replay control component 714 of FIG. 7, responsive to input received from the given participant, etc.). According to another example, the speed management component 800 can dynamically determine the playback speed as a function of at least one of a length of a time period within the conference call missed by the participant or a length of a time period remaining in the conference call. Following this example, the speed management component 800 can increase the playback speed as the length of the time period within the conference call missed by the participant increases and/or as the length of the time period remaining in the conference call decreases.

It is contemplated that the speed management component 800 can perform pitch-shifting on audio data included in the recorded content 132. Additionally or alternatively, the speed management component 800 can synchronize differing types of data included in the recorded content 132 for replay.

Figure 9:
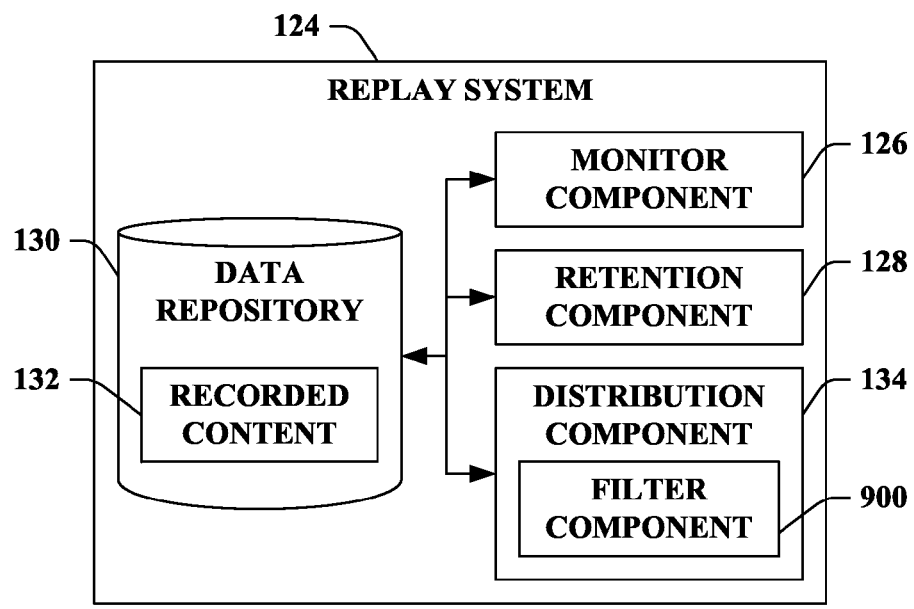

Reference is now made to FIG. 9. The replay system 124 includes the distribution component 134, which can further include a filter component 900. The filter component 900 can filter the recorded content 132. According to an example, the recorded content 132 can include audio data (e.g., spoken by different participants on the conference call). The filter component 900 can filter the audio data as a function of an identity of a speaker to output speaker-specific audio data. Thus, responsive to the detection of the establishment of the connection of the participant to the conference call by the monitor component 126, at least a portion of the speaker-specific audio data can be transmitted by the distribution component 134 to the computing device of the participant. It is contemplated that the speaker-specific audio data can be replayed by the computing device of the participant at the speed at which such data is recorded (e.g., pitch-shifting need not be performed) and/or replayed at a speed that differs from the speed at which such data is recorded (e.g., the speed management component 800 can alter the speed, perform pitch-shifting, etc.).

Pursuant to an illustration, a participant who misses a portion of the conference call can specify the identity of the speaker (or speakers) used to filter the audio data. For instance, the participant may desire to hear the audio data from a facilitator of the conference call, while skipping audio data from other audience members of the conference call. Thus, the filter component 900 can filter the audio data to output the speaker-specific audio data of the facilitator (with the audio data of the other audience members removed). Responsive to the detection of the establishment of the connection of the participant to the conference call, at least a portion of the speaker-specific audio data of the facilitator can be transmitted by the distribution component 134 to the computing device of the participant.

Figure 10:
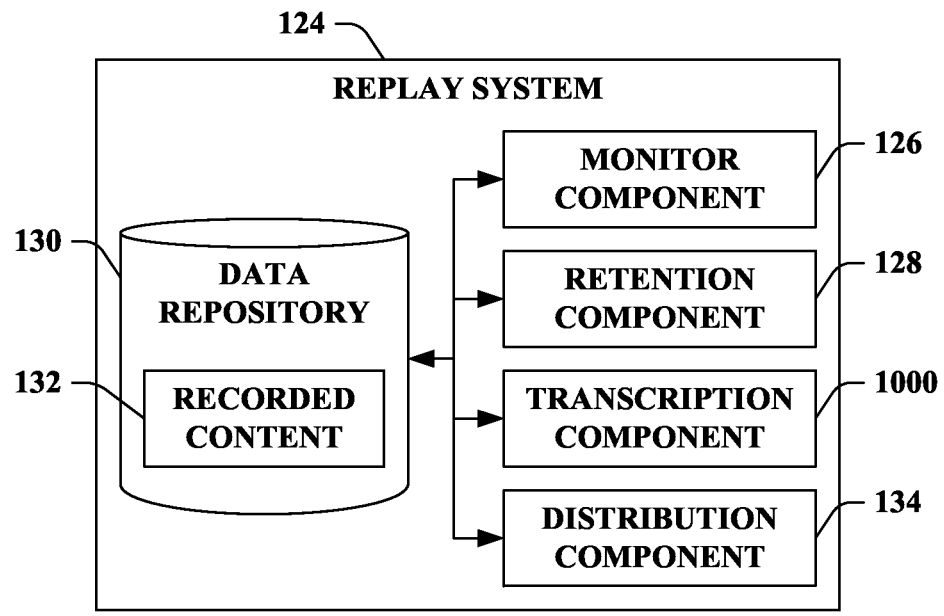

As illustrated in FIG. 10, the replay system 124 can further include a transcription component 1000. Again, the recorded content 132 of the conference call can include audio data. The transcription component 1000 can transcribe the audio data to text data (e.g., by performing speech to text transcription). The speech to text transcription can be effectuated by the transcription component 1000 for the entire conference call, a portion of the conference call that is missed by a participant, or the like. Further, responsive to the detection of the establishment of the connection of the participant to the conference call by the monitor component 126, the distribution component 134 can transmit at least a portion of the text data to the computing device of the participant for display on a display screen of a computing device. Accordingly, a participant who reads quickly may catch up to real time in less time by reading the transcripts (e.g., the text data) of the missed portion of the conference call.

By way of example, the distribution component 134 can send the text data instead of the audio data to the computing device of the participant. Pursuant to another example, the distribution component 134 can transmit both the text data and the audio data to the computing device of the participant. In accordance with yet another example, the distribution component 134 can switch between sending the text data or the audio data to the computing device of the participant (e.g., based upon input received from the computing device, etc.).

Figure 11:
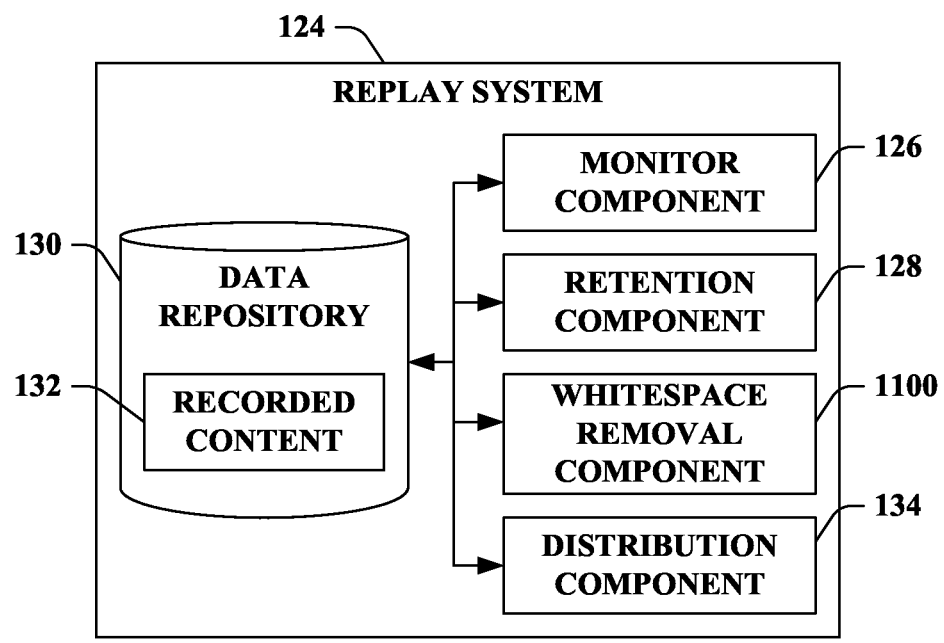

Turning to FIG. 11, illustrated is the replay system 124 further comprising a whitespace removal component 1100. Again, the recorded content 132 of the conference call can include audio data. The whitespace removal component 1100 can apply pause detection to the audio data to output filtered audio data by removing whitespace from the audio data (e.g., removing pauses in speech). For instance, frames in the audio data that include whitespace can be detected and removed from the audio data by the whitespace removal component 1100. Accordingly, responsive to the detection of the establishment of the connection of the participant to the conference call by the monitor component 126, the distribution component 134 can transmit at least a portion of the filtered audio data to the computing device of the participant. Upon removing the whitespaces, it is contemplated that the filtered audio data can be replayed by the computing device of the participant at the speed at which such data is recorded (e.g., pitch-shifting need not be performed) and/or replayed at a speed that differs from the speed at which such data is recorded (e.g., the speed management component 800 can alter the speed, perform pitch-shifting, etc.).

While examples set forth herein pertain to a conference call with three or more participants, it is to be appreciated that many of the examples can be extended to a call with two participants. For instance, for a call with two participants, a first participant can continue to talk when a second participant is disconnected from the call (e.g., content of the call can be recorded); upon rejoining the call, the second participant can catch up employing techniques described herein.

FIGS. 12-15 illustrate exemplary methodologies relating to recording and replaying recorded content of a conference call. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 12:
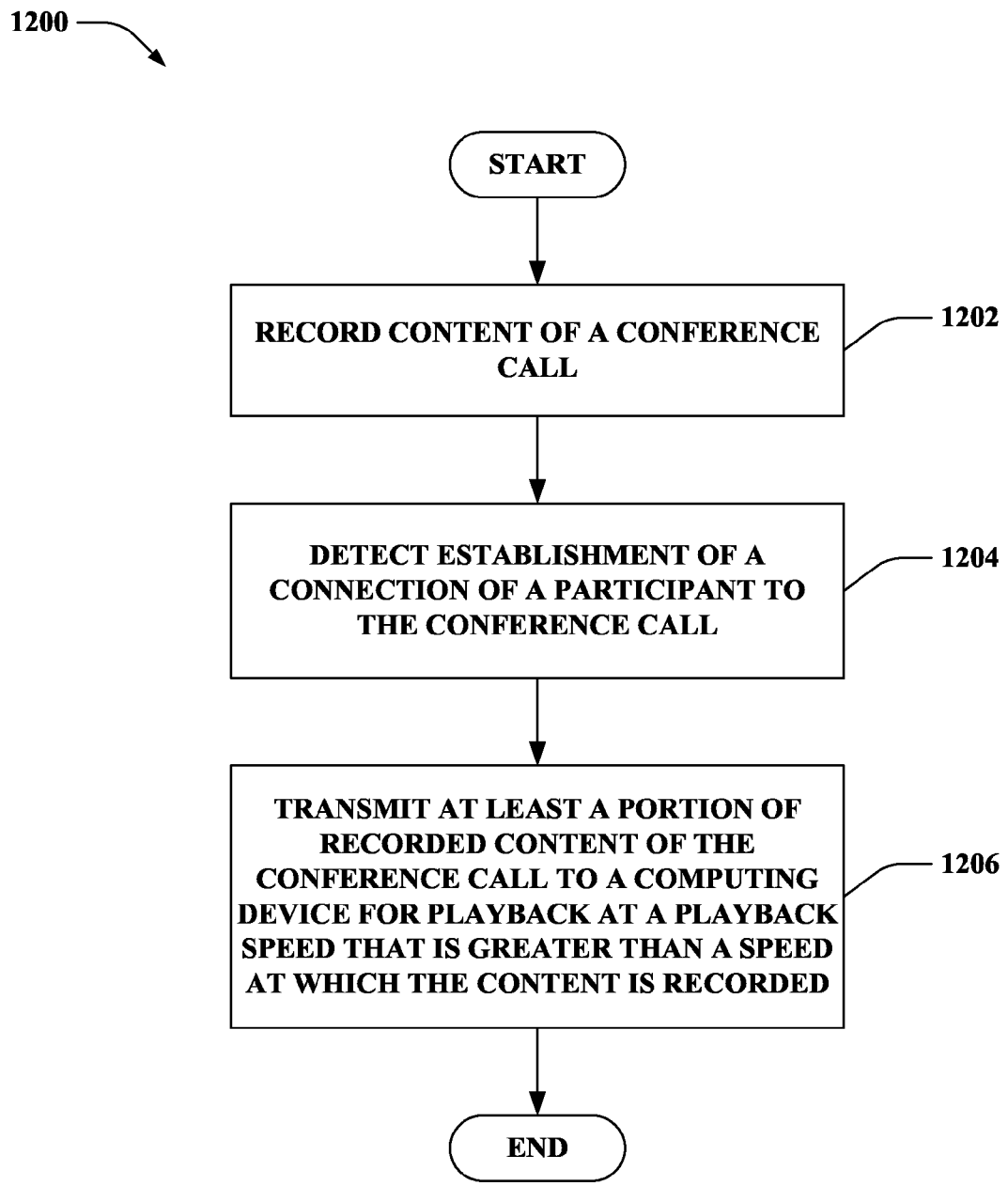
FIG. 12 is a flow diagram that illustrates an exemplary methodology for enabling a participant to reach real time in an ongoing conference call.

FIG. 12 illustrates a methodology 1200 for enabling a participant to reach real time in an ongoing conference call. At 1202, content of a conference call can be recorded. At 1204, establishment of a connection of the participant to the conference call can be detected. The connection can be established with a computing device of the participant. Moreover, the establishment of the connection of the participant to the conference call can be detected subsequent to initiation of the recording of the content of the conference call. At 1206, at least a portion of recorded content of the conference call can be transmitted to the computing device for playback at a playback speed that is greater than a speed at which the content is recorded. Transmission of the portion of the recorded content of the conference call can be responsive to detection of the establishment of the connection of the participant to the conference call.

Figure 13:
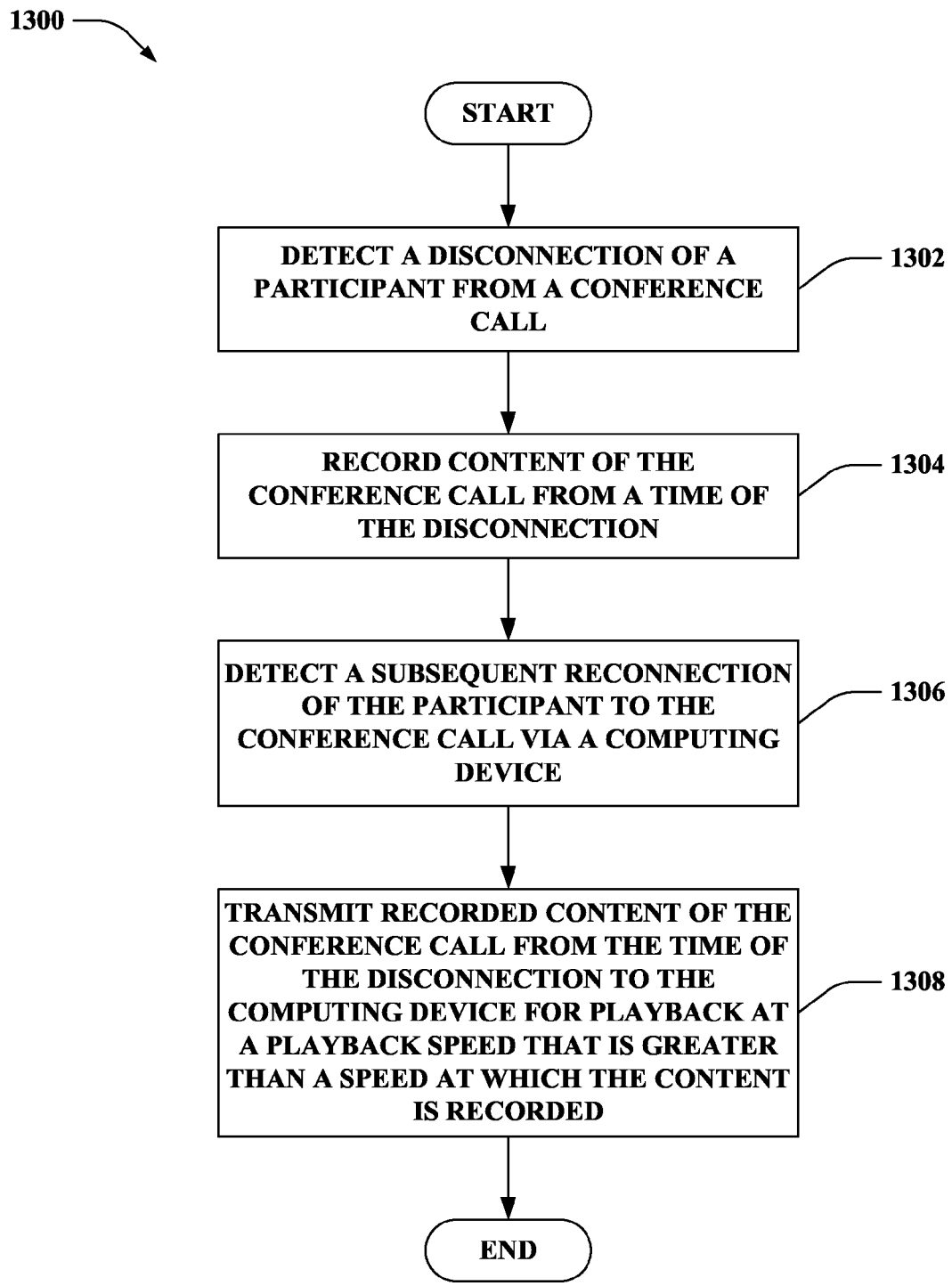
FIG. 13 is a flow diagram that illustrates an exemplary methodology for enabling a participant to catch up in an ongoing conference call.

Referring now to FIG. 13, illustrated is a methodology 1300 for enabling a participant to catch up in an ongoing conference call. At 1302, a disconnection of the participant from the conference call can be detected. At 1304, content of the conference call can be recorded from a time of the disconnection of the participant from the conference call. At 1306, a subsequent reconnection of the participant to the conference call via a computing device can be detected. The computing device can be the same computing device which was previously disconnected from the conference call or a disparate computing device as compared to the computing device which was previously disconnected from the conference call. At 1308, recorded content of the conference call from the time of the disconnection can be transmitted to the computing device for playback at a playback speed that is greater than a speed at which the content is recorded. Thus, the conference call can be resumed from a point in time of disconnection of the participant.

Figure 14:
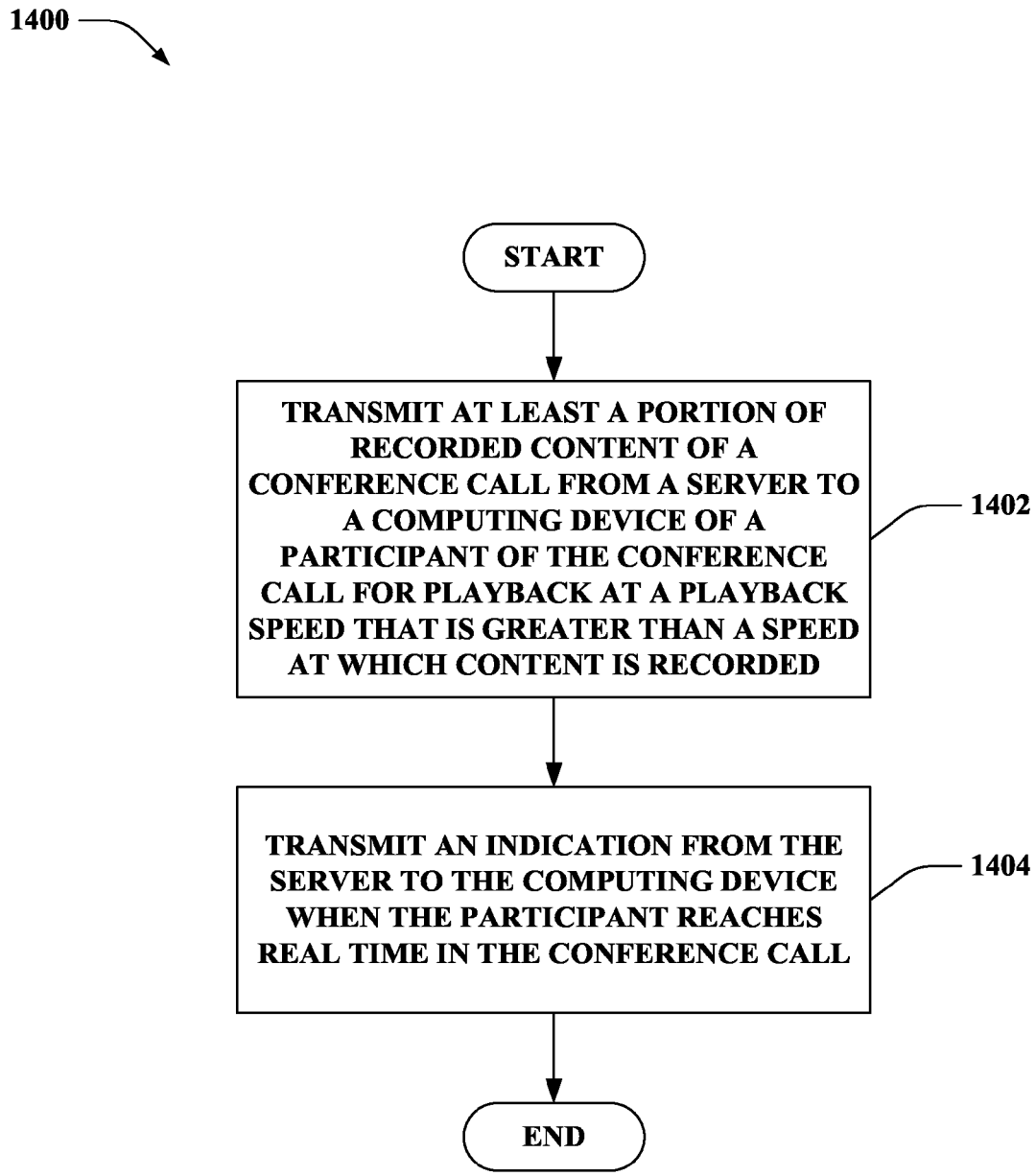
FIG. 14 is a flow diagram that illustrates an exemplary methodology for causing a notification to be generated by a computing device of a participant of a conference call.

With reference to FIG. 14, illustrated is a methodology 1400 for causing a notification to be generated by a computing device of a participant of a conference call. At 1402, at least a portion of recorded content of a conference call can be transmitted from a server to the computing device of the participant of the conference call for playback at a speed that is greater than a speed at which content is recorded, where a connection of the participant to the conference call is established with the computing device. At 1404, an indication can be transmitted from the server to the computing device when the participant reaches real time in the conference call. The indication can cause the computing device to output a notification that signifies that the participant is at real time in the conference call.

Moreover, a disparate indication can be transmitted from the server to at least one disparate computing device of at least one disparate participant connected to the conference call. The disparate indication can be transmitted when the participant reaches real time in the conference call. The disparate indication can cause the at least one disparate computing device to output a notification that signifies that the participant is at real time in the conference call.

Figure 15:
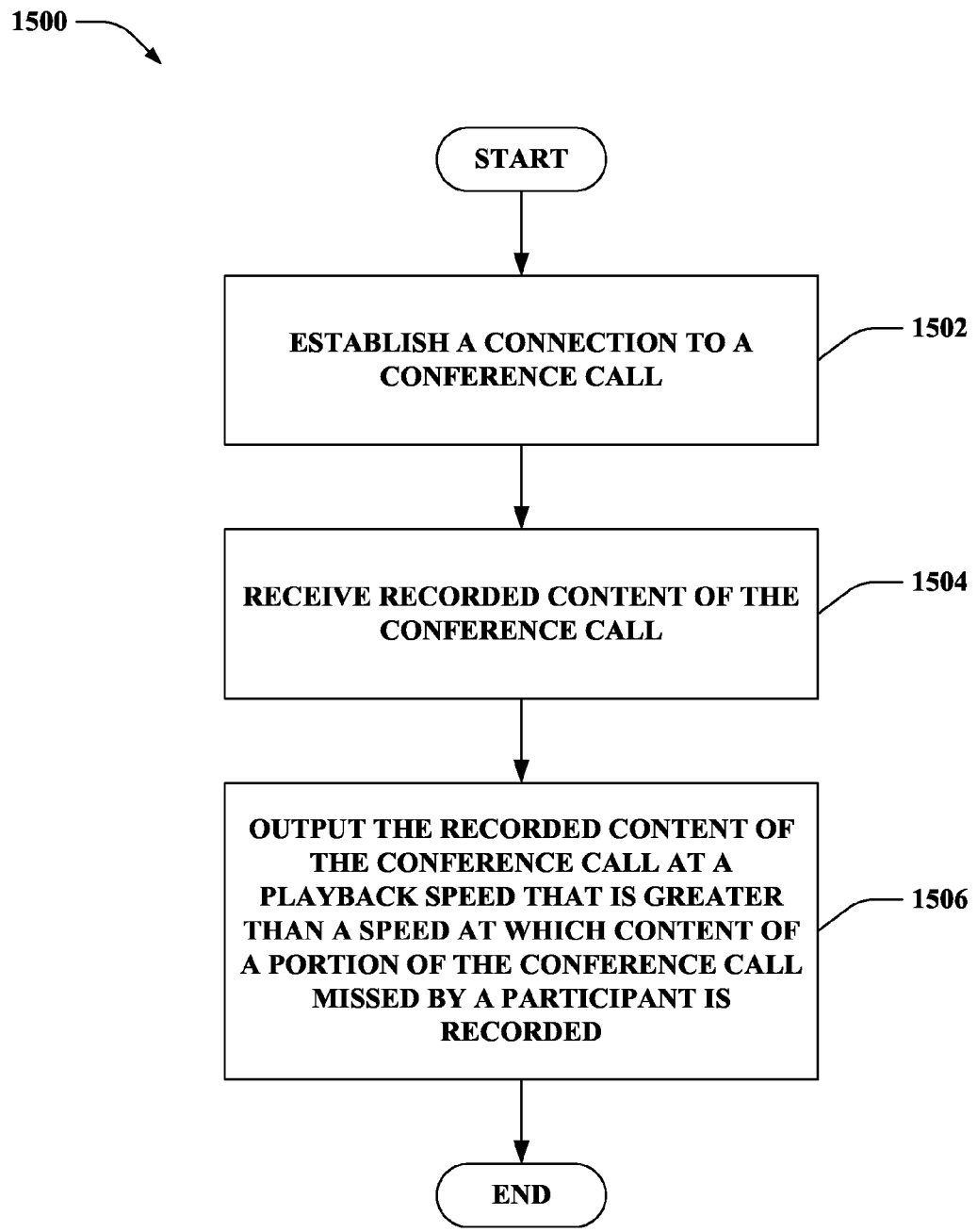
FIG. 15 is a flow diagram that illustrates an exemplary methodology for operating a computing device of a participant of a conference call.

Turning to FIG. 15, illustrated is a methodology 1500 for operating a computing device of a participant of a conference call. At 1502, a connection to a conference call can be established. The connection can be established subsequent to a portion of the conference call missed by the participant. At 1504, recorded content of the conference call can be received. The recorded content of the conference call can include at least a part of the portion of the conference call missed by the participant. At 1506, the recorded content of the conference call can be output at a playback speed that is greater than a speed at which the portion of the conference call missed by the participant is recorded.

Figure 16:
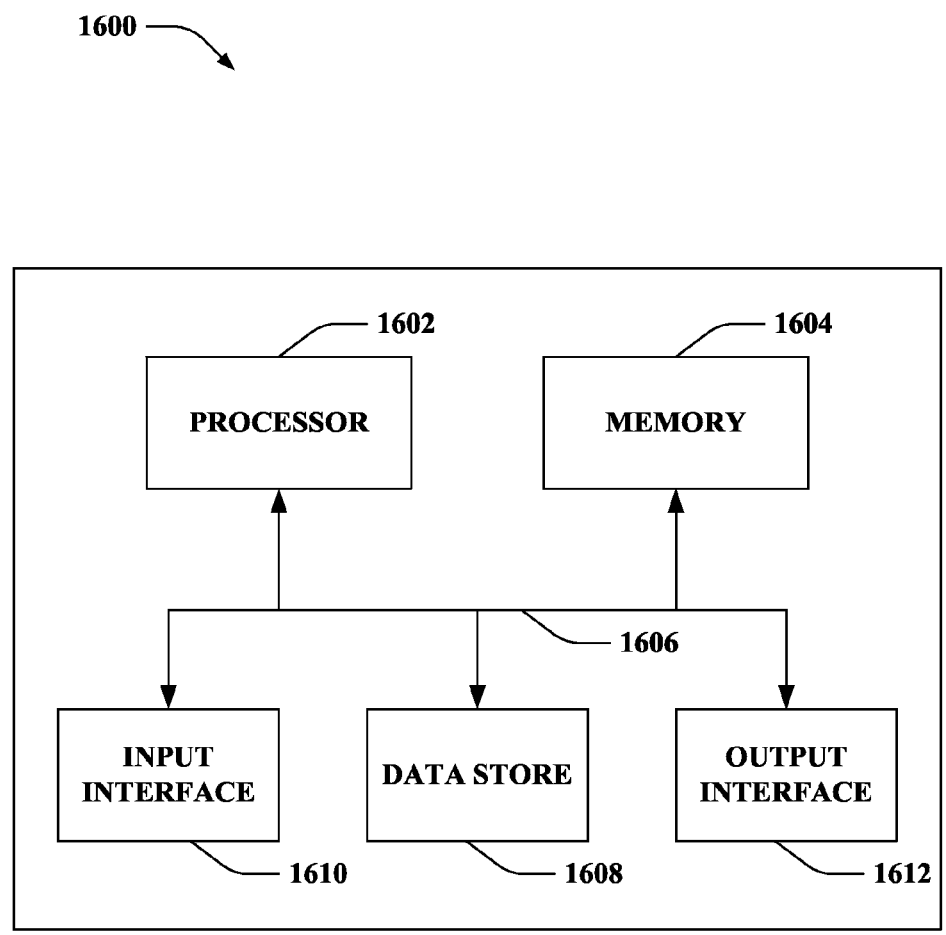
FIG. 16 illustrates an exemplary computing device.

Referring now to FIG. 16, a high-level illustration of an exemplary computing device 1600 that can be used in accordance with the systems and methodologies disclosed herein is illustrated. For instance, the computing device 1600 may be used in a system that records content of a conference call and transmits recorded content of the conference call to a computing device for replay at an increased speed responsive to detection of establishment of a connection of the participant to the conference call. By way of another example, the computing device 1600 may be used to output recorded content of a conference call received from a replay system. Pursuant to another example, the computing device 1600 may be used to provide notifications pertaining to status information. The computing device 1600 includes at least one processor 1602 that executes instructions that are stored in a memory 1604. The instructions may be, for instance, instructions for implementing functionality described as being carried out by one or more components discussed above or instructions for implementing one or more of the methods described above. The processor 1602 may access the memory 1604 by way of a system bus 1606. In addition to storing executable instructions, the memory 1604 may also store recorded content, timestamps, received content, and so forth.

The computing device 1600 additionally includes a data store 1608 that is accessible by the processor 1602 by way of the system bus 1606. The data store 1608 may include executable instructions, recorded content, timestamps, received content, etc. The computing device 1600 also includes an input interface 1610 that allows external devices to communicate with the computing device 1600. For instance, the input interface 1610 may be used to receive instructions from an external computer device, from a user, etc. The computing device 1600 also includes an output interface 1612 that interfaces the computing device 1600 with one or more external devices. For example, the computing device 1600 may display text, images, etc. by way of the output interface 1612.

It is contemplated that the external devices that communicate with the computing device 1600 via the input interface 1610 and the output interface 1612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1600 may be a distributed system. Thus, for instance, several devices may be in communication by way of a network connection and may collectively perform tasks described as being performed by the computing device 1600.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
    recording content of a conference call;
    detecting establishment of a connection of a participant to the conference call, wherein the connection is established with a computing device of the participant, and wherein the establishment of the connection of the participant to the conference call is detected subsequent to initiation of the recording of the content of the conference call;
    responsive to detection of the establishment of the connection of the participant to the conference call, transmitting at least a portion of recorded content of the conference call to the computing device for playback at a playback speed that is greater than a speed at which the content is recorded; and
    transmitting an indication to at least one disparate computing device of at least one disparate participant connected to the conference call, wherein the indication is transmitted when the participant reaches real time in the conference call, and wherein the indication causes the at least one disparate computing device to output a notification that signifies that the participant is at real time in the conference call.

2. The method of claim 1, wherein the connection of the participant to the conference call comprises a reconnection of the participant to the conference call, and wherein a prior connection of the participant to the conference call is previously disconnected.

3. The method of claim 2, further comprising:
    detecting a disconnection of the prior connection of the participant from the conference call; and
    responsive to detection of the disconnection of the prior connection of the participant from the conference call, initiating the recording of the content of the conference call.

4. The method of claim 1, further comprising transmitting an indication to the computing device when the participant reaches real time in the conference call, wherein the indication causes the computing device to output a notification that signifies that the participant is at real time in the conference call.

5. The method of claim 1, wherein the content of the conference call is recorded with a timestamp that specifies a beginning of a time period within the conference call missed by the participant.

6. The method of claim 1, further comprising discontinuing the recording of the content of the conference call when the participant reaches real time in the conference call and disparate participants of the conference call are at real time in the conference call.

7. The method of claim 1, wherein the playback speed is dynamically determined as a function of at least one of a length of a time period within the conference call missed by the participant or a length of a time period remaining in the conference call.

8. The method of claim 1, wherein the recorded content of the conference call comprises audio data, further comprising:
    transcribing the audio data to text data; and
    responsive to the detection of the establishment of the connection of the participant to the conference call, transmitting at least a portion of the text data to the computing device for display on a display screen of the computing device.

9. The method of claim 1, wherein the recorded content of the conference call comprises audio data, further comprising:
    applying pause detection to the audio data to output filtered audio data by removing whitespace from the audio data; and
    responsive to the detection of the establishment of the connection of the participant to the conference call, transmitting at least a portion of the filtered audio data to the computing device.

10. The method of claim 1, wherein the recorded content of the conference call comprises audio data, further comprising:
    filtering the audio data as a function of an identity of a speaker to output speaker-specific audio data; and
    responsive to the detection of the establishment of the connection of the participant to the conference call, transmitting at least a portion of the speaker-specific audio data to the computing device.

11. The method of claim 1, further comprising determining a bit rate for the recording of the conference call, wherein the content of the conference call is recorded at the bit rate.

12. A computing device of a participant of a conference call, comprising:
a connection component that establishes a connection to the conference call, wherein the connection is established subsequent to a portion of the conference call missed by the participant, wherein the participant is not connected to the conference call during the portion of the conference call missed by the participant;
an interface component that receives recorded content of the conference call, wherein the recorded content of the conference call comprises at least a part of the portion of the conference call missed by the participant with the participant not connected to the conference call;
a content output component that outputs the recorded content of the conference call at a playback speed that is greater than a speed at which content of the portion of the conference call missed by the participant is recorded; and
a notification component that outputs a notification that signifies whether a disparate participant of the conference call is at real time in the conference call.

13. The computing device of claim 12, the notification component further outputs a notification that signifies whether the participant is at real time in the conference call.

14. The computing device of claim 12, further comprising an interaction management component that mutes a microphone of the computing device when the content output component outputs the recorded content and unmutes the microphone of the computing device when the participant is at real time in the conference call.

15. The computing device of claim 12, further comprising a replay control component that controls the playback speed of the recorded content.

16. A method, comprising:
transmitting at least a portion of recorded content of a conference call from a server to a computing device of a participant of the conference call for playback at a playback speed that is greater than a speed at which content is recorded, wherein a connection of the participant to the conference call is established with the computing device;
transmitting an indication from the server to the computing device when the participant reaches real time in the conference call, wherein the indication causes the computing device to output a notification that signifies that the participant is at real time in the conference call; and
transmitting a disparate indication from the server to at least one disparate computing device of at least one disparate participant connected to the conference call, wherein the disparate indication is transmitted when the participant reaches real time in the conference call, and wherein the disparate indication causes the at least one disparate computing device to output a notification that signifies that the participant is at real time in the conference call.

17. The method of claim 16, further comprising:
recording the content of the conference call; and
detecting establishment of the connection of the participant to the conference call, wherein the establishment of the connection of the participant to the conference call is detected subsequent to initiation of the recording of the content of the conference call, and wherein the portion of the recorded content of the conference call is transmitted responsive to detection of the establishment of the connection of the participant to the conference call.

18. The computing device of claim 12, wherein the conference call is a peer-to-peer conference call.

19. The computing device of claim 12, wherein the conference call is a centralized server-based conference call.

20. The computing device of claim 12, wherein the conference call is a combination of a peer-to-peer conference call and a centralized server-based conference call.

\* \* \* \* \*